United States Patent
Fadell et al.

(10) Patent No.: US 8,606,374 B2
(45) Date of Patent: Dec. 10, 2013

(54) THERMODYNAMIC MODELING FOR ENCLOSURES

(75) Inventors: Anthony Michael Fadell, Portola Valley, CA (US); Matthew Lee Rogers, Los Gatos, CA (US); Kipp Avery Rogers, Chicago, IL (US); Abraham K. Ishihara, Palo Alto, CA (US); Shahar Ben-Menahem, Mountain View, CA (US); Rangoli Sharan, Sunnyvale, CA (US)

(73) Assignee: Nest Labs, Inc., Palo Alto, CA (US)

( * ) Notice: Subject to any disclaimer, the term of this patent is extended or adjusted under 35 U.S.C. 154(b) by 200 days.

(21) Appl. No.: 12/881,463

(22) Filed: Sep. 14, 2010

(65) Prior Publication Data

US 2012/0065783 A1    Mar. 15, 2012

(51) Int. Cl.
   *G05B 11/01* (2006.01)
(52) U.S. Cl.
   USPC .............................. 700/31; 700/278; 700/300
(58) Field of Classification Search
   USPC ..................... 700/29–31, 276–278, 299–300
   See application file for complete search history.

(56) References Cited

U.S. PATENT DOCUMENTS

| | | |
|---|---|---|
| 4,223,831 A | 9/1980 | Szarka |
| 4,335,847 A | 6/1982 | Levine |
| 4,685,614 A | 8/1987 | Levine |
| 4,751,961 A | 6/1988 | Levine |
| 4,897,798 A | 1/1990 | Cler |
| 5,088,645 A | 2/1992 | Bell |

(Continued)

FOREIGN PATENT DOCUMENTS

| | | |
|---|---|---|
| CA | 2202008 C | 2/2000 |
| EP | 196069 B1 | 12/1991 |
| JP | 59106311 A | 6/1984 |
| JP | 01252850 A | 10/1989 |

OTHER PUBLICATIONS

International Search Report and Written Opinion mailed Jan. 6, 2012 in corresponding PCT Application No. PCT/US2011/051579.

(Continued)

*Primary Examiner* — Mohammad Ali
*Assistant Examiner* — Nathan Laughlin
(74) *Attorney, Agent, or Firm* — Kilpatrick Townsend & Stockton LLP (57) ABSTRACT

Systems and methods for modeling the behavior of an enclosure for use by a control system of an HVAC system are described. A model for the enclosure that describes the behavior of the enclosure for use by the control system is updated based on a weather forecast data. The weather forecast data can include predictions more than 24 hours in the future, and can include predictions such as temperature, humidity and/or dew point, solar output, precipitation. The model for the enclosure can also be updated based on additional information and data such as historical weather data such as temperature, humidity, wind, solar output and precipitation, occupancy data, such as predicted and/or detected occupancy data, calendar data, and data from the one or more weather condition sensors that sense current parameters such as temperature, humidity, wind, precipitation, and/or solar output. The model for the enclosure can be updated based also on an enclosure model stored in a database, and/or on enclosure information from a user. The model can be updated based on active testing of the enclosure which can be performed automatically or in response to user input. The testing can include heating and/or cooling the enclosure at times when the enclosure is not likely to be occupied.

27 Claims, 10 Drawing Sheets

(56) References Cited

U.S. PATENT DOCUMENTS

| | | | |
|---|---|---|---|
| 5,211,332 A | 5/1993 | Adams | |
| 5,240,178 A | 8/1993 | Dewolf | |
| 5,395,042 A | 3/1995 | Riley | |
| 5,476,221 A | 12/1995 | Seymour | |
| 5,555,927 A | 9/1996 | Shah | |
| 5,611,484 A | 3/1997 | Uhrich | |
| 5,902,183 A | 5/1999 | D'Souza | |
| 5,909,378 A | 6/1999 | De Milleville | |
| 5,977,964 A | 11/1999 | Williams | |
| 6,062,482 A | 5/2000 | Gauthier | |
| 6,098,893 A | 8/2000 | Berglund | |
| 6,216,956 B1 | 4/2001 | Ehlers | |
| 6,349,883 B1 | 2/2002 | Simmons | |
| 6,645,066 B2 | 11/2003 | Gutta | |
| 6,769,482 B2 | 8/2004 | Wagner | |
| 7,024,336 B2 | 4/2006 | Salsbury | |
| RE40,437 E | 7/2008 | Rosen | |
| 7,469,550 B2 | 12/2008 | Chapman, Jr. | |
| 7,644,869 B2 | 1/2010 | Hoglund | |
| 7,784,704 B2 | 8/2010 | Harter | |
| 7,802,618 B2 | 9/2010 | Simon | |
| 7,854,389 B2 | 12/2010 | Ahmed | |
| 8,090,477 B1 | 1/2012 | Steinberg | |
| 2004/0249479 A1 | 12/2004 | Shorrock | |
| 2005/0128067 A1 | 6/2005 | Zakrewski | |
| 2005/0189429 A1 | 9/2005 | Breeden | |
| 2005/0192915 A1 | 9/2005 | Ahmed et al. | |
| 2005/0194455 A1* | 9/2005 | Alles | 236/1 B |
| 2006/0186214 A1 | 8/2006 | Simon | |
| 2006/0196953 A1 | 9/2006 | Simon | |
| 2007/0115902 A1 | 5/2007 | Shamoon et al. | |
| 2008/0015742 A1 | 1/2008 | Kulyk | |
| 2008/0191045 A1 | 8/2008 | Harter | |
| 2008/0317292 A1 | 12/2008 | Baker | |
| 2009/0005912 A1* | 1/2009 | Srivastava et al. | 700/276 |
| 2009/0171862 A1 | 7/2009 | Harrpd | |
| 2009/0259713 A1 | 10/2009 | Blumrich | |
| 2010/0019051 A1 | 1/2010 | Rosen | |
| 2010/0025483 A1 | 2/2010 | Hoeynck | |
| 2010/0070084 A1 | 3/2010 | Steinberg | |
| 2010/0070086 A1 | 3/2010 | Harrod | |
| 2010/0070234 A1 | 3/2010 | Steinberg | |
| 2010/0084482 A1 | 4/2010 | Kennedy | |
| 2010/0211224 A1 | 8/2010 | Keeling | |
| 2010/0262298 A1 | 10/2010 | Johnson | |
| 2010/0280667 A1 | 11/2010 | Steinberg | |
| 2010/0289643 A1 | 11/2010 | Trundle | |
| 2010/0308119 A1 | 12/2010 | Steinberg | |
| 2010/0318227 A1 | 12/2010 | Steinberg | |
| 2011/0046792 A1 | 2/2011 | Imes | |
| 2011/0046805 A1 | 2/2011 | Bedros | |
| 2011/0046806 A1 | 2/2011 | Nagel | |
| 2011/0106328 A1* | 5/2011 | Zhou et al. | 700/291 |
| 2011/0185895 A1 | 8/2011 | Freen | |
| 2012/0085831 A1 | 4/2012 | Kopp | |

OTHER PUBLICATIONS

Braeburn Systems LLC, "Braeburn Premier Series Universal Auto Changeover 5300 Installer Guide," 2009, 10 pages.
Braeburn Systems LLC, "Braeburn Premier Series Programmable Thermostats Model 5200 Product Manual," 2011, 11 pages.
Carrier Corp., "SYSTXCCUIZ01-V Infinity Control Installation Instructions," 2012, 20 pages.
Carrier Corp., "TB-PAC TB-PHP Base Series Programmable Thermostats Installation Instructions," 2012, 8 pages.
Ecobee, "Ecobee Smart Thermostat Installation Manual," 2011, 20 pages.
Ecobee, "Ecobee Smart Thermostat User Manual," 2010, 20 pages.
Honeywell International, Inc., "Honeywell Installation Guide FocusPRO TH6000 Series," 2012, 24 pages.
Honeywell International, Inc., "Honeywell Operating Manual FocusPRO TH6000 Series," 2011, 80 pages.
Honeywell International, Inc., "Honeywell THX9321 Prestige 2.0 and THX9421 Prestige IAQ 2.0 with EIM Product Data," 2012, 126 pages.
Honeywell International, Inc., "Honeywell Operating Manual Prestige THX9321/9421," 2011, 120 pages.
Honeywell International, Inc., "Honeywell Installation Guide VisionPRO TH8000 Series," 2012, 12 pages.
Honeywell International, Inc., "Honeywell Operating Manual VisionPRO TH8000 Series," 2011, 96 pages.
Honeywell International, Inc., "Honeywell User Guide VisionPRO Wi-Fi Programmable Thermostat," 2012, 48 pages.
Hunter Fan Co., "Internet Thermostat Installation Guide," 2012, 8 pages.
Lennox Industries, Inc., "Owner's Guide ComfortSense 5000 Series Models L5711U and L5732U Programmable Touch Screen Thermostats," 2008, 32 pages.
Lennox Industries, Inc., "Homeowner's Manual ComfortSense 7000 Series Model L7742U Touch Screen Programmable Thermostat," 2009, 15 pages.
Lennox Industries, Inc., "Homeowner's Manual icomfort Touch Thermostat Touch Screen Programmable Communicating Thermostat," 2010, 20 pages.
Robertshaw, "9620 User's Manual: Quick Start Installation and Programming," 2001, 14 pages.
Robertshaw, "9825i2 User's Manual," 2006, 36 pages.
Trane, "Trane Communicating Thermostats for Fan Coil Control," May 2011, 32 pages.
Trane, "Trane Communicating Thermostats for Heat Pump Control," May 2011, 32 pages.
Trane, "Trane Install XL600 Installation—Manual," 2006, 16 pages.
Trane, "Trane Install XL950 Installation Manual," 2011, 20 pages.
Venstar, "T2900 Owner's Manual," 2008, 113 pages.
Venstar, "T5800 Owner's Manual and Installation Instructions," Date Unknown, 63 pages.
Washington State University, "Electric Heat Lock Out on Heat Pumps," Apr. 2010, 3 pages.
Ecobee, "Smart Si Installation Manual," 2012, 40 pages.
Ecobee, "Smart Si Thermostat User Manual," 2012, 44 pages.
Network Thermostat, "NetX RP32-WIFI Thermostat," 2012, 2 pages.
Lu, J., et al., "The Smart Thermostat Using Occupancy Sensors to Save Energy in Homes," University of Virginia, 2010, 14 pages.
Gao, G., et al., "The Self-Programming Thermostat Optimizing Setback Schedules based on Home Occupancy Patterns," University of Virginia, 2009, 6 pages.
Honeywell, "Perfect Climate Comfort Center Control System," 2001, 44 pages.
Honeywell, "T8611G Chronotherm IV Deluxe Programmable Heat Pump Thermostat," 1997, 24 pages.
Ecobee, "WiFi Enabled Smart Thermostat Part 2 the Features Review," 2011, 5 pages. Accessed at: www.homenetworkenabled.com/content . . . .
Loisos, G., et al., "Alternatives to Compressor Cooling," California Energy Commission, 2000, 80 pages.
Research Products Corporation, "Aprilair Electronic Thermostats User's Manual Model 8355," Dec. 2000, 16 pages
Lux Products Corporation, "Instruction Manual LUXPRO PSPU732T," Jan. 2009, 48 pages.
White Rodgers, "Model 1F81-261 Installation and Operating Instructions," Apr. 2010, 8 pages.
White Rodgers, "Model IF98EZ-1621 Homeowner's User Guide," Jan. 2012, 28 pages.
Network Thermostat, "NetX RP32-WIFI Thermostat Consumer Brochure," May 2011, 2 pages.
Ecobee, Introducing the New Smart Si Thermostat. Datasheet [online]. Ecobee, Mar. 2012 [retrieved on Feb. 25, 2013]. Retrieved from the Internet: <URL: https://www.ecobee.com/solutions/home/smart-si/>.

* cited by examiner

THERMODYNAMIC MODELING FOR ENCLOSURES

COPYRIGHT AUTHORIZATION

A portion of the disclosure of this patent document may contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

This invention generally relates to thermodynamic modeling for enclosures. More particularly, embodiments of this invention relate to modeling of internal environmental behavior of an enclosure for use by an HVAC control system.

In conditioning a building such as dwelling other enclosure one or more system for heating, ventilating and air conditioning (HVAC) are typically used. HVAC control systems need to make decisions as to how to condition the enclosure appropriately. Since the enclosure has an associated thermal mass that needs to be heated or cooled, how and when the heating or cooling is carried out can greatly impact the energy efficiency as well as the cost of the process Conventionally, a structural model, that attempts to specify how the enclosure will behave under the influence of an HVAC system, is created based on various factors (size, windows, orientation, etc.). That model is then used to specify the type and size of HVAC system to install and/or it is used by the HVAC control system throughout the lifetime of the building. For example, U.S. Pat. No. 7,072,727 discusses a method for determining heat loss of a building and for the proper sizing of HVAC equipment for the building.

It is also known for model updates to occur after installation through simple calculations such as adding heat and measuring time and temperature. For example, U.S. Pat. No. 5,555,927 discusses an adapted recovery method for a setback thermostat using the intersection of the space temperature with a sloped recovery temperature line which approximates the change in temperature as a function of time during recovery of the temperature controlled space from the setback temperature, to determine the time at which recovery to the occupancy temperature should begin. The recovery line slope is re-calculated and updated.

U.S. Patent Application Publication No. 2005/0192915 discusses a system for forecasting predicted thermal loads for a building including a neural-network-based thermal load predictor. The neural network can be trained using building data, occupancy data and actual weather conditions. A thermal condition forecaster uses a simple regression model based on forecasted high and low temperatures for a specific locale and measured local temperature and humidity observations made immediately prior to the prediction.

Systems and methods for modeling the behavior of an enclosure for use by a control system of an HVAC system installed in the enclosure are described herein. According to some embodiments method, weather forecast data predicting future weather conditions for a region including the location of the enclosure are received. A model for the enclosure that describes the behavior of the enclosure for use by the control system is updated based on the weather forecast data. The HVAC system for the enclosure is then controlled using the updated model for the enclosure.

According to some embodiments, the weather forecast data includes predictions more than 24 hours in the future, and can include predictions such as temperature, humidity and/or dew point, solar output, precipitation, wind and natural disasters. According to some embodiments the model for the enclosure is updated based also on historical weather data such as temperature, humidity, wind, solar output and precipitation.

According to some embodiments, the model for the enclosure is updated based in part on the occupancy data, such as predicted and/or detected occupancy data. The model for the enclosure updating can also be based calendar data.

According to some embodiments, the model for the enclosure is updated based also on the data from the one or more weather condition sensors that sense current parameters such as temperature, humidity, wind, precipitation, and/or solar output. According to some embodiments, the locations of the weather condition sensors can be automatically detected.

According to some embodiments, the model for the enclosure is updated based also on an enclosure model stored in a database, and/or on enclosure information from a user.

According to some embodiments systems and methods are described for modeling internal environmental behavior of an enclosure that includes actively inducing a change in the internal environment of the enclosure, measuring a response of the internal environment of the enclosure from the induced change, and updating a model for the enclosure that describes behavior of the enclosure for use by the control system based at least in part on the measurement of the response from the induced change.

According to some embodiments the change is actively induced primarily for purposes of updating the model for the enclosure, rather than for conditioning the internal environment of the enclosure. The change can be actively induced in response to input by a user, or it can be induced automatically by the processing system for example due to the type of enclosure or a change in season. The change is preferably induced at a time when the enclosure is likely to be unoccupied. The induced change, for example, can be heating and/or cooling by the HVAC system.

As used herein the term "model" refers generally to a description or representation of a system. The description or representation can use mathematical language, such as in the case of mathematical models. Examples of types of models and/or characteristics of models, without limitation, include: lookup tables, linear, non-linear, deterministic, probabilistic, static, dynamic, and models having lumped parameters and/or distributed parameters.

As used herein the terms "profile," "structure profile," "structure model," "enclosure profile," "enclosure model," "building profile," "building model" and the like refer to any numerical or mathematical description or models of at least some of thermodynamic behavioral characteristics of a building, enclosure and/or structure, for example for use in HVAC applications.

As used herein the term "sensor" refers generally to a device or system that measures and/or registers a substance, physical phenomenon and/or physical quantity. The sensor may convert a measurement into a signal, which can be interpreted by an observer, instrument and/or system. A sensor can be implemented as a special purpose device and/or can be implemented as software running on a general-purpose computer system.

As used herein the term "structure" includes enclosures and both non-buildings and buildings. As used herein the term "enclosure" means any structure having one or more enclosed areas, and also includes any building. Examples of structures and enclosures include, but are not limited to: residential buildings, commercial buildings and complexes, industrial buildings, sites and installations, and civil constructions.

As used herein the term "thermodynamic" includes all state variables that can be used to characterize a physical system. Examples of thermodynamic variables include, but are not limited to: pressure, temperature, airflow, humidity, and particulate matter.

It will be appreciated that these systems and methods are novel, as are applications thereof and many of the components, systems, and methods employed therein. It should be appreciated that embodiments of the presently described inventive body of work can be implemented in numerous ways, including as processes, apparatuses, systems, devices, methods, computer readable media, and/or as a combination thereof. Several illustrative embodiments are described below.

BRIEF DESCRIPTION OF THE DRAWINGS

The inventive body of work will be readily understood by referring to the following detailed description in conjunction with the accompanying drawings, in which.

DETAILED DESCRIPTION

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

Figure 1:
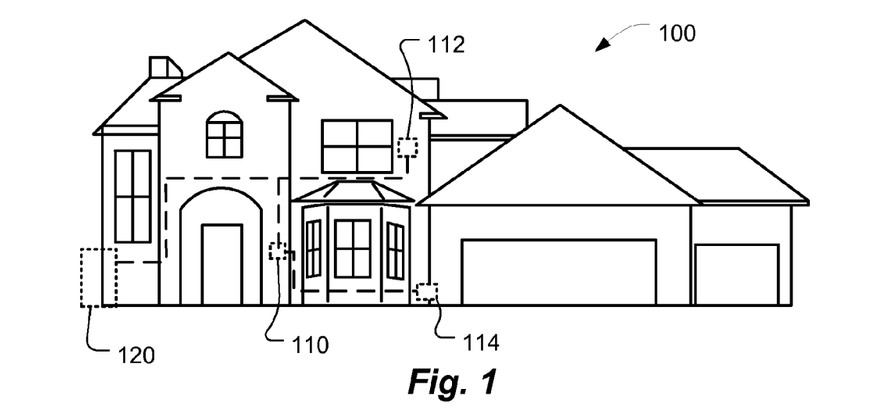
FIG. 1 is a diagram of a enclosure for which behavior is predicted, according to some embodiments.

FIG. 1 is a diagram of an enclosure for which thermodynamic behavior is predicted, according to some embodiments. Enclosure 100, in this example is a single-family dwelling According to other embodiments, the enclosure can be, for example, a duplex, an apartment within an apartment building, a commercial structure such as an office or retail store, or a structure or enclosure that is a combination of the above. Enclosure thermodynamic behavior prediction device 110 is shown located within enclosure 100 and includes all or some of the functionality described with respect to FIG. 4, including the enclosure thermodynamic behavior prediction engine 420. According to some embodiments, one or more separate sensors 112 and 114, such as weather condition sensors for temperature, humidity, etc., are located inside and/or outside of the enclosure 100. According to some embodiments, the devices 110, 112 and 114 all have similar or identical functionality and each contains one or more weather condition sensors, and each can be used to predict enclosure thermodynamic behavior and/or generate and update enclosure models. Communication between devices each such device and/or sensor can be via hard wiring, or via wireless, e.g. radio frequency, communication technology. According to some embodiments, output regarding occupancy from device 110 is communicated to an HVAC system 120.

Figure 2:
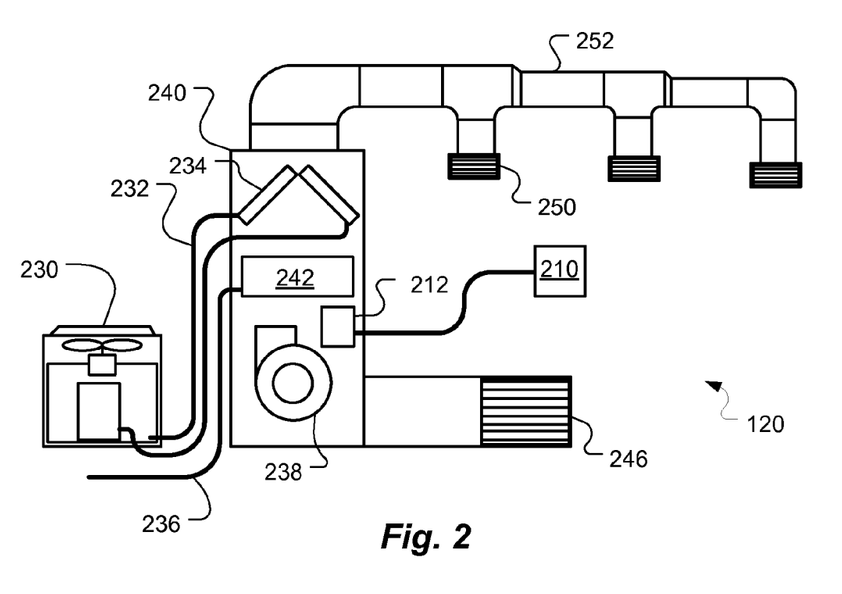
FIG. 2 is a diagram of an HVAC system, according to some embodiments.

FIG. 2 is a diagram of an HVAC system, according to some embodiments. HVAC system 120 provides heating, cooling, ventilation, and/or air handling for the enclosure, such as a single-family home 100 depicted in FIG. 1. The system 120 depicts a forced air type system, although according to other embodiments, other types of systems could be used such as hydronic and/or in-floor radiant heating. In heating, heating coils or elements 242 within air handler 240 provide a source of heat using electricity or gas via line 236. Cool air is drawn from the enclosure via return air duct 246 through fan 238 and is heated heating coils or elements 242. The heated air flows back into the enclosure at one or more locations via supply air duct system 252 and supply air grills such as grill 250. In cooling an outside compressor 230 passes gas such a freon through a set of heat exchanger coils to cool the gas. The gas then goes to the cooling coils 234 in the air handlers 240 where it expands, cools and cools the air being circulated through the enclosure via fan 238. Although not shown in FIG. 2, according to some embodiments the HVAC system has other known functionality such as venting air to and from the outside, and one or more dampers to control airflow within the duct systems.

The system is controlled by algorithms implemented via control electronics 212 that communicate with a thermostat 210. According to some embodiments, the thermostat 210 includes some or all of enclosure thermodynamic behavior prediction functionality described with respect to FIG. 3.

At certain times it is believed someone will be in the enclosure, for example via occupancy predictions—see copending U.S. patent application Ser. No. 12/881,430, entitled "Occupancy pattern detection, estimation and prediction," by Fadell et. al., filed on even date herewith, and issued as U.S. Pat. No. 8,510,255, which is incorporated herein by reference. Accordingly decisions need to be made as to how to condition the enclosure appropriately. Since the enclosure, such as enclosure 100, has a thermal mass that needs to be heated or cooled, how and when the heating or cooling is carried out can greatly impact the energy efficiency as well as the cost of the process. For example, if the enclosure requires cooling and the outside air temperature is cooler then we may pull in cool air from the outside instead of turning on the air conditioning. In another example, a prediction that the weather will be quite warm, may lead to the enclosure being pre-cooled long before the sun rises because it is much more efficient to cool the enclosure before the sun rises than at later times in the day. An accurate an up-to-date enclosure model is greatly beneficial in making such decisions.

Figure 3:
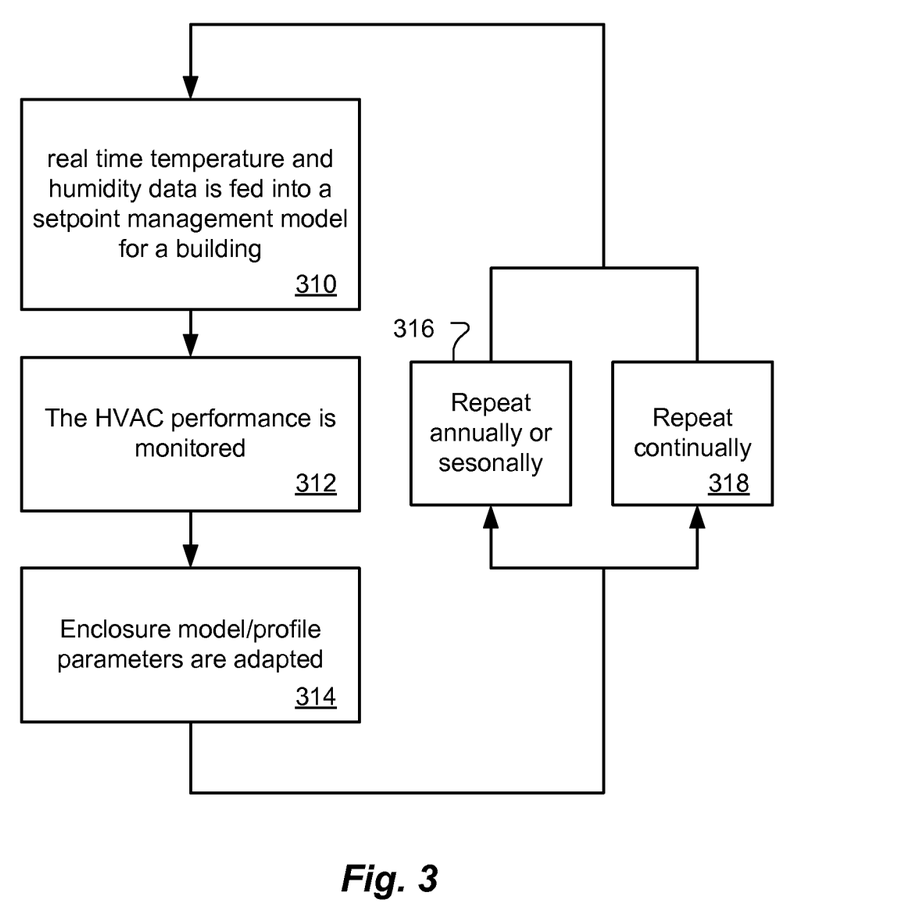
FIG. 3 is a flowchart illustrating steps in repeated enclosure modeling, according to some embodiments.

FIG. 3 is a flowchart illustrating steps in repeated enclosure modeling, according to some embodiments. Conventional thermostats may use models that are set at the factory and static. According to some embodiments, in step 310 real time temperature and humidity data is fed into a setpoint management model for a building. In step 312, the HVAC performance is monitored. In step 314 the enclosure model parameters are adjusted accordingly. Over time the aggregated knowledge of how the HVAC performs in various weather conditions, also factoring in time of day and season, enriches the enclosure model. Thus, according to embodiments, an enclosure's energy performance is modeled or the model is updated one or more times after installation of the HVAC system.

In step 316, an enclosure's energy performance is modeled one or more times after installation (for example, once per year, or once per season) to gather data relating to: seasonal changes in performance; weather-related changes in performance; changes in performance over time. Examples of positive performance changes could be due to home improvements. Examples of negative performance changes could be due to aging and disrepair of the building.

In step 318, an enclosure's thermodynamic response can be continually modeled by an algorithm that uses input and output data including: hourly, daily, weekly and monthly changes due to weather, temperature and solar output; changes due to temporary drafts such as an open window; changes due to moisture content of the air; changes due to occupancy of the dwelling.

Figure 4:
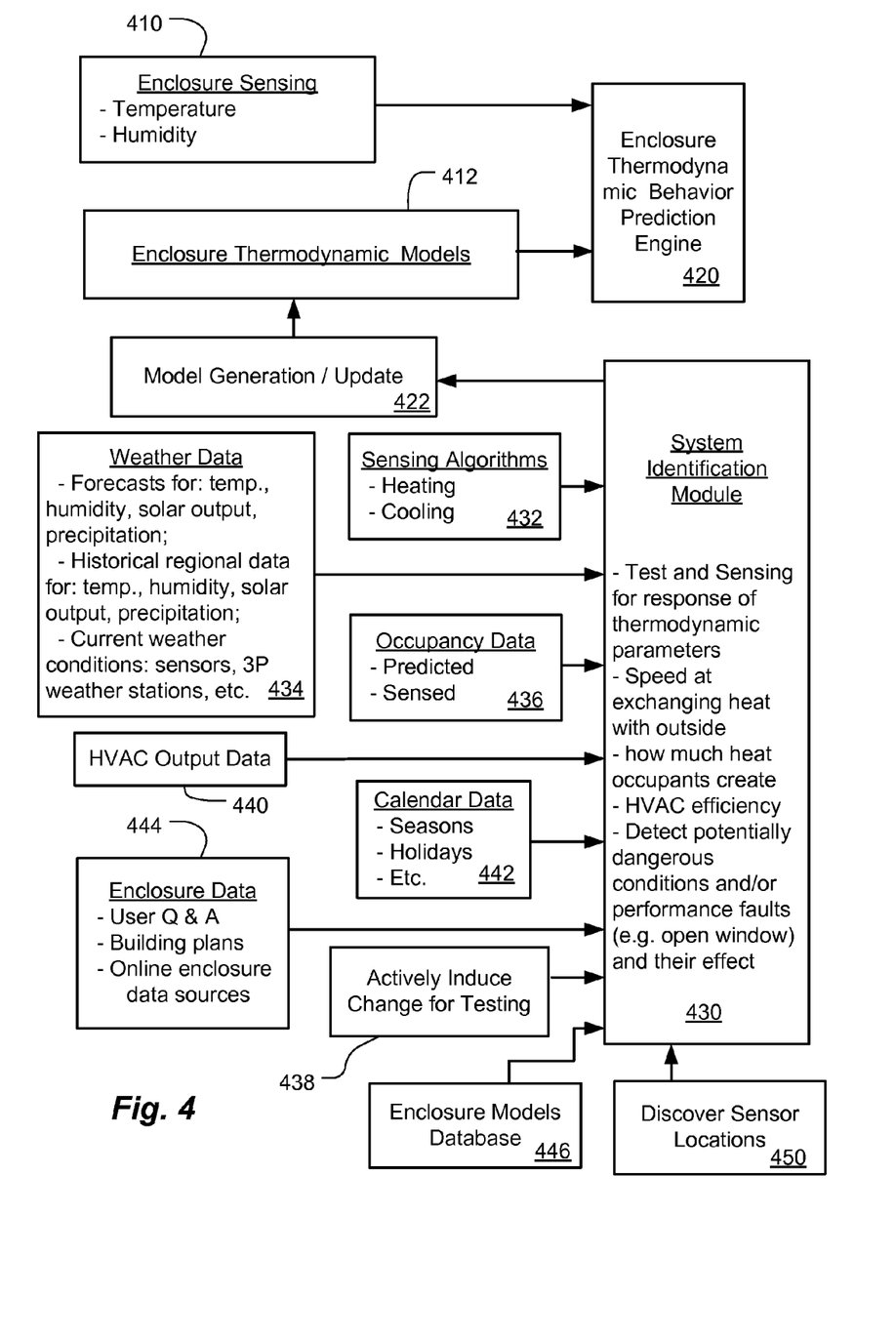
FIG. 4 is a block diagram illustrating a system for enclosure behavior prediction, according to some embodiments.
Figure 5:
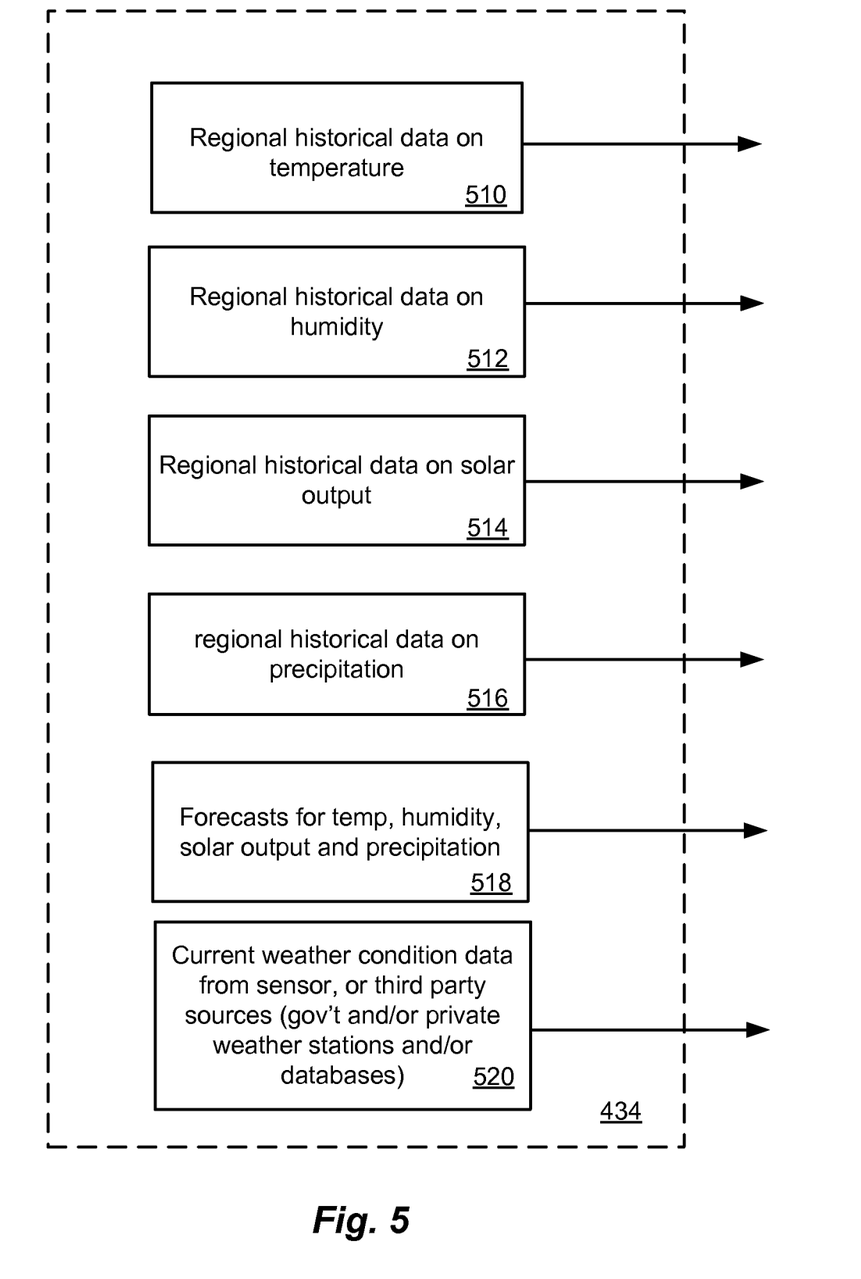
FIG. 5 is a block diagram illustrating further detail regarding input of weather data for enclosure modeling, according to some embodiments.

FIG. 4 is a block diagram illustrating a system for enclosure thermodynamic behavior prediction, according to some embodiments. Various types of data are collected into the system identification module 430 which is used to test the response of one or more thermodynamic parameters, according to some embodiments. Weather data 434 includes regional historical data on temperature, humidity, solar output, precipitation and other relevant weather data, which are input in order to predict the current enclosure model of the building. Weather data 434 can also include current weather condition information such as can be measured with sensors in, on or around the enclosure. According to some embodiments, weather condition data can be obtained from third party sources such as government agencies, private source and/or nearby private weather stations. FIG. 5 is a block diagram illustrating further detail regarding input of weather data 434 for enclosure modeling, according to some embodiments.

Referring to FIG. 5, regional historical data on temperature 510, according to some embodiments is included to allow the system to predict how much heating or cooling is likely to be necessary in the enclosure. For example, on a summer day that has historically had temperatures into the 90s, the system can anticipate the likelihood that cooling is needed.

According to some embodiments, regional historical data on humidity 512 is included to let the system anticipate whether heating or cooling is needed to achieve perceived comfort in the enclosure. Temperatures with high humidity are often perceived to be warmer than the same temperature with a low humidity; so it may be useful to use cooling methods such as air conditioning to reduce humidity for days and regions with historical high humidity. For example, for a 78 degree setpoint, the system will predict that with high humidity 78 degrees will feel much warmer. Therefore it will cool the enclosure more than usual to account for the extra perceived heat due to high humidity.

According to some embodiments, regional historical data on solar output 514 is input to allow the system to anticipate the likelihood that solar heat will affect the enclosure's external temperature. For example, on a February day in Berkeley, Calif. that has historically been very sunny, the system may need to heat much less than the same day in Connecticut that has historically been very cloudy.

According to some embodiments, regional historical data on precipitation 516 is input to allow the system to anticipate when more heat will be necessary to maintain a comfortable temperature, as rainy days tend to be cooler than sunny days.

According to some embodiments, forecasts 518 for parameters such as temperature, humidity, solar output and precipitation are input. The forecasts can be short term, for example the next 24-48 hours, medium term, for examples 2-4 days, and/or long term, for example 5-7 days. According to some embodiments, such long term forecasts are not used as they are not sufficiently reliable. According to some embodiments, the forecasts can come from one or more commercial forecasting services and/or governmental forecasting services, depending on the geographic location of the enclosure.

According to some embodiments, current weather condition information 520 is gathered. Weather condition information can be measured with sensors in, on or around the enclosure, or as mentioned above, weather condition data can be obtained from third party sources such as government agencies, private source and/or nearby private weather stations.

Thus, according to some embodiments, weather data includes past, current and future (forecast) data relating to characteristics such as: temperature, humidity, wind, irradiance and precipitation. According to some embodiments, the past, current and forecast data are, used to (1) build a thermodynamic response model in real time; and (2) as inputs to a control algorithm. Additionally, the forecast data is used to determine which model should be used in the control algorithm.

Referring again to FIG. 4, various sensing algorithms 432 such as heating algorithms and cooling algorithms can be used to sense the status of parameters such as indoor temperature, humidity, etc. in response to heating and cooling.

Occupancy data 436, according to some embodiments, is provided to the system identification algorithm, such as can be sensed and/or predicted. It has been found that occupancy can be an important factor. Not only do occupants generate heat, but many activities that the occupants carry out generate heat, such as watching television, using computer equipment, cooking, etc. For further detail on predicting and/or sensing occupancy within the enclosure, see co-pending U.S. Patent Application entitled "Occupancy Prediction and Detection," by Fadell et. al., filed on even date herewith, which is incorporated herein by reference.

According to some embodiments, HVAC output, and/or other behavior information 440 such as settings, characteristics, power, etc. are input to the system identification module 430.

According to some embodiments, calendar data 442 is input to the system identification module 430. The calendar data can be obtained directly from a user, for example and can include information such as the dates of holidays, weekdays, weekends, other work schedule information, as well as information relating to seasons of the year.

According to some embodiments, enclosure data 444 is input to the system identification module 430. Enclosure data may include information about the enclosure, such as the number of bedrooms, bathrooms, etc. as well as the use of certain rooms, such as some rooms being used a home office, exercise, etc. The enclosure data may also come from other sources, such as building plans, which can be entered manually for example at the time of installation or at other times. According to some embodiments, enclosure data can come from online sources such as online real estate databases or other databases or online services that collect publically available information.

Figure 6:
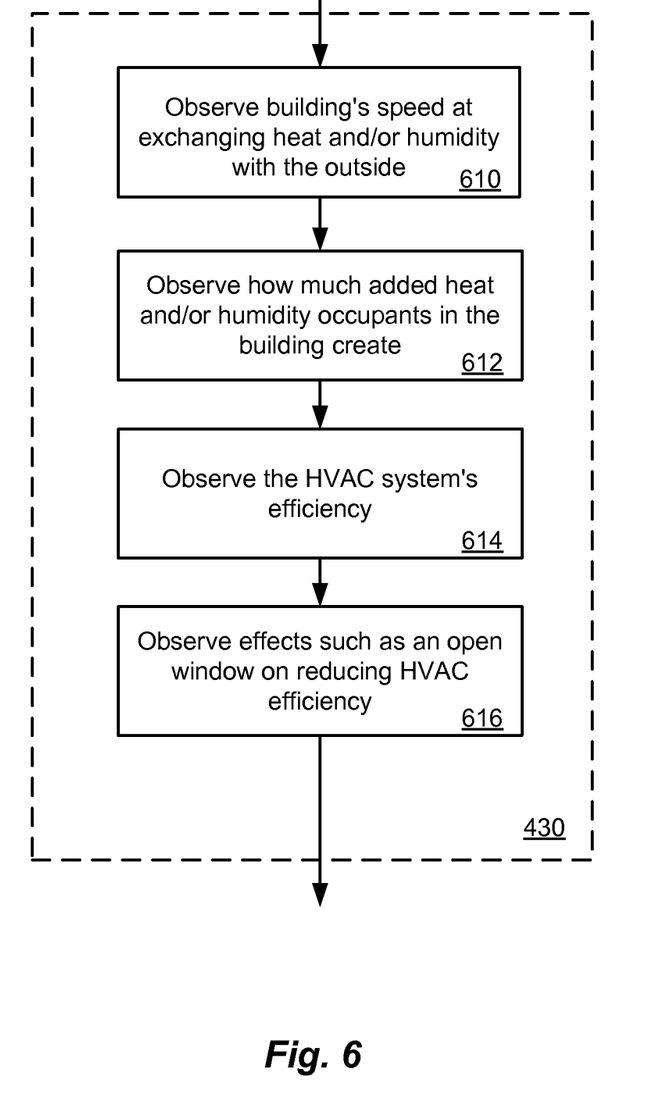
FIG. 6 is a flow chart illustrating further detail regarding a system identification module for enclosure modeling, according to some embodiments.

FIG. 6 is a flow chart illustrating further detail regarding system identification module 430 for enclosure modeling, according to some embodiments. In step 610, the building's speed at exchanging heat with the outside (i.e., the time it takes for heat to dissipate on cold days or cool air to dissipate on warm days) is measured, according to some embodiments, is observed. According to some embodiments, the measurement of step 610 also includes the building's speed at exchanging humidity with the outside environment is also performed. This information will allow the system to predict when heating or cooling and or humidification/dehumidification should be turned on in order to achieve or maintain a desired temperature, humidity and/or comfort level. For example, a well insulated building exchanges heat with the outside slowly, and so would need less heat over time to maintain a desired temperature than a drafty, poorly insulated building.

In step 612, how much added heat and/or humidity occupants in the building create is measured, by factoring in the discrepancy in temperature and/or humidity when the enclosure is occupied and unoccupied for a given temperature and/or humidity setting. This data will then be used to change the desired temperature, humidity and/or comfort level based on a prediction of the perceived temperature, humidity and/or comfort level due to added occupant heat and/or humidity.

In step 614, the HVAC system's efficiency is measured, in order to predict how long it will take the system to produce enough heating, cooling, humidification and/or dehumidification to achieve a desired temperature, humidity and/or comfort level. For example, if the system knows it takes thirty minutes to heat the enclosure to 72 degrees when it is starting at a temperature of 60 degrees, it will start the system thirty minutes before 72 degrees is needed (if the kids get home from school in the afternoon at 3:00, the system will have started heating at 2:30).

In step 616, effects such as an open window on reducing HVAC efficiency are measured. As the system knows the usual rate of heat and/or humidity exchange between the enclosure and the outside, it will be able to detect a rapid change in this rate of exchange, for example an open door or window. The system will then factor in this change as a different HVAC efficiency rate. Additionally, according to some embodiments, such information facilitates the detection of performance faults, such as an open window.

Note that although the steps in FIG. 6 are shown in sequential order, according to some embodiments, the steps are performed in other orders including some or all of the steps being performed in parallel.

According to some embodiments, the system identification can be carried out using a first principles model, grey box or black box models. The first principles model can be based on thermodynamic and humidity equations describing the structure, which can be distributed or lumped, complete or approximated. For example, complete first principle models can estimate conductive and convective heat flow within the structure, conductive and convective heat loss or gain at the outer surface of the structure, radiative heat exchange of the environment with the structure and heat and moisture balance equations for each thermodynamic zone, and also include thermodynamic model of the HVAC system itself Example of an approximated first principles model is the CIBSE admittance method. Grey box models combine both experimental data and physical insight for modeling for example autoregressive models with exogenous inputs (ARX) where the inputs may include the HVAC on/off status and the present weather, while black box models use no prior information about the thermodynamic equations, for example neural networks.

Any of the above models can be identified using online, batch or offline learning algorithms in an analytical or numerical manner. Various learning methods and algorithms used can include some or a combination of those mentioned for the enclosure thermodynamic behavior prediction engine 420.

Figure 7:
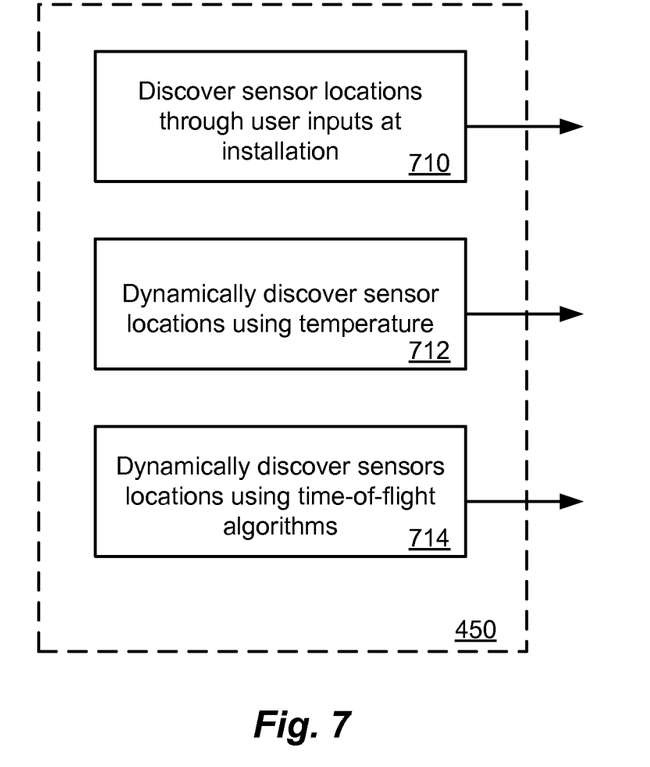
FIG. 7 is a block diagram illustrating methods sensor location discovery, according to some embodiments.

FIG. 7 is a block diagram illustrating methods sensor location discovery, according to some embodiments. In step 710, sensor locations are discovered through user inputs at installation, to learn if a sensor is in a living area, near an entrance or a window, in a shaded or sunny area, in a badly insulated area, and/or on a different floor from one of the other sensors.

In step 712, sensor locations are dynamically discovered using temperature, to learn if a sensor is in a living area, near an entrance or a window, in a shaded or sunny area, in a badly insulated area, and/or on a different floor from one of the other sensors.

In step 714, sensor locations are dynamically discovered using Zigbee or other wireless protocol, and/or time-of-flight algorithms (using communicating sensors aware of their locations to create a picture of the house's temperature), to learn if a sensor is in a living area, near an entrance or a window, in a shaded or sunny area, in a badly insulated area, and/or on a different floor from one of the other sensors.

Referring again to FIG. 4, an enclosure models database 446 is generated by observing how various types of enclosures (for example, single family homes, apartments, varied architectural styles of dwellings) perform in varied weather conditions and climates. This data is input to and then accessible from a library in a central database 446. According to some embodiments, enclosure models from database 446, in combination with other information, allow the system to predict how much heating and cooling is necessary for a given enclosure type in a given climate.

The output from system identification module 430 is used in step 422 to generate one or more enclosure models, for example by using the output of 430 to set appropriate statistical coefficients in the mathematical models. According to some embodiments, the existing enclosure models 412 are tuned-up or updated in step 422 using the information from 430 so as to become more accurate.

The resulting enclosure thermodynamic models 412, being based on the system identification module 430 are specific to the enclosure (unlike the models in database 446) for use by the enclosure thermodynamic behavior prediction engine 420.

Enclosure sensor data 410 for parameters such as temperature and humidity are inputted into the enclosure thermodynamic behavior prediction engine 420. According to some embodiments, one or more methods of discovering sensor locations such as described with respect to FIG. 7, are used. By more accurately knowing the locations of the sensors, greater accuracy is provide in detecting real-time building temperature.

Enclosure prediction engine 420 predicts how the enclosure will react to activity of various HVAC systems when the enclosure is under the influence of weather and other factors.

According to other embodiments, one or more of the following could be used in enclosure prediction engine 420 and/or by the system identification module 430 alone or in combination: Neural Network, Bayesian Network, Graphical Model, Regression Tree, other tree-based model, Additive Models, (Linear, Quadratic, Fisher, or another) Discriminant Analysis, Support Vector Machines, another classification technique, Principle Component Analysis, Factor Analysis, Kernel Methods, Ordinary Regression, Logistic Regression, Penalized (or Regularized) Regression, another type of regression, boosting methods, Splines, Wavelets, Least-squares function fitting, another type of function estimation, Expectation-Maximization Algorithm, Nearest Neighbor Algorithms, Clustering Algorithms, another learning technique, another time series forecasting technique. According to some embodiments, AR (auto regressive), MA (moving average), or ARMA (autoregressive moving average) time series methods are used. According to some embodiments an auto-regressive with exogenous terms (ARX) is used.

According to some embodiments, enclosure prediction engine 420 allows for predicting and addressing structural changes over time. For example, by monitoring HVAC settings, the system can be used to remind the user of scheduled maintenance needs like filter changes. In another example, the system can discover HVAC performance faults, such as described in system identification module 430, and notify the user. According to some embodiments, the system can further offer diagnostic guidance with respect to performance faults where possible.

Figure 8:
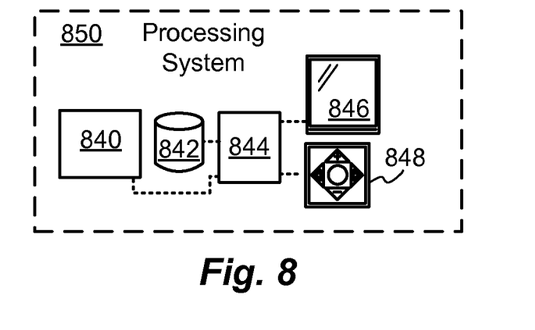
FIG. 8 is a schematic of a processing system used to generate and update enclosure models, according to some embodiments.

FIG. 8 is a schematic of a processing system used to generate and update enclosure models, according to some embodiments. In particular, processing system 850 is used to perform much of the functionality described with respect to FIG. 4, including system identification module 430, model generation 432, enclosure thermodynamic models 412, and enclosure thermodynamic behavior prediction engine 420. Processing system 850 includes one or more central processing units 844, storage system 842, communications and input/output modules 840, a user display 846 and a user input system 848.

According to some embodiments, in step 438, a change is actively induced for the purposes of testing. Further detail is provided in FIG. 9, which is a flow chart showing steps for actively inducing a change for the testing purposes, according to some embodiments. In step 914 a user requests enclosure model testing, for example by issuing a command or pressing a "test" button. The user, for example, might issue such a request after a substantial change in the structure, such as following remodeling work, replacing windows, adding insulation, etc. In response to the user's request for an active test, in step 910 a change is induced by instructing the HVAC system to heat and/or cool the enclosure, in step 916. By heating and/or cooling the enclosure, the system identification module 430 can carry out to generate a new thermodynamic model for the enclosure which may replace the currently used model.

Figure 9:
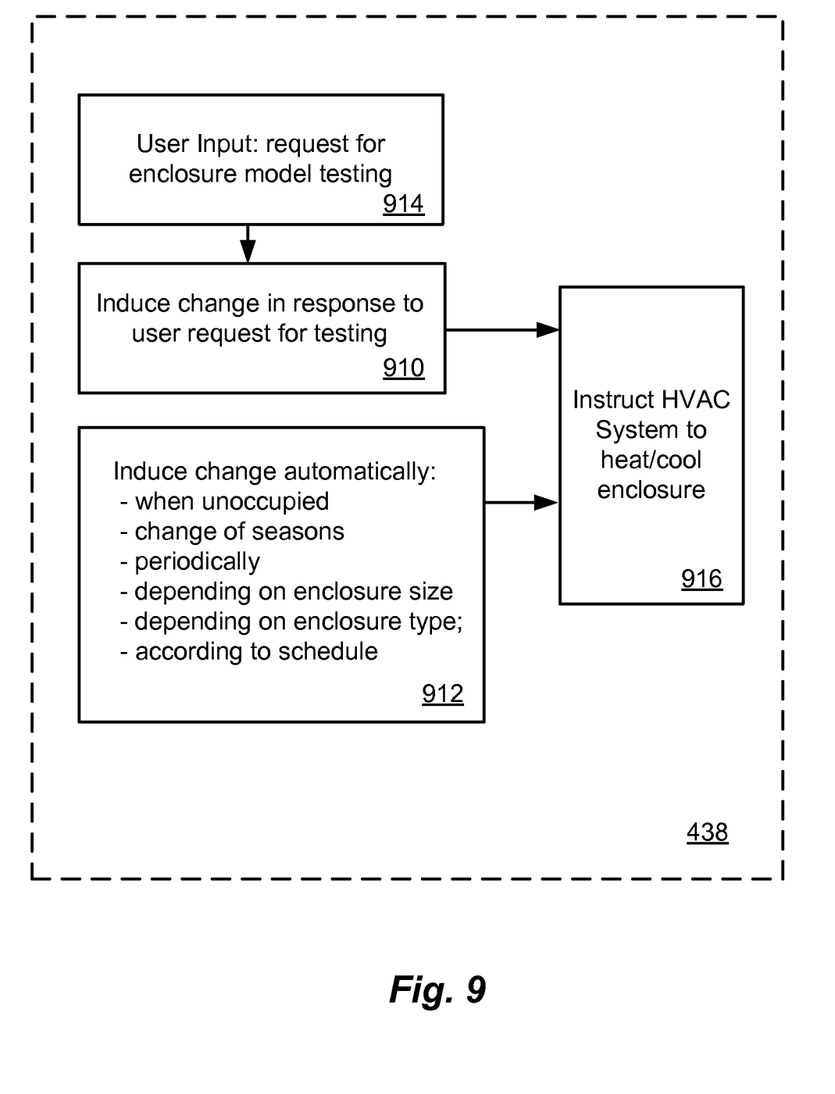
FIG. 9 is a flow chart showing steps for actively inducing a change for testing purposes, according to some embodiments.

According to some embodiments, testing is performed autonomously, without a request being issued by a user. In step 912, a decision is made to induce a change for testing purposed based on a number of factors. Factors that can be used include changing of seasons, after a fixed period of time (for example months or years), depending on the size of the enclosure, the type of enclosure (e.g. single family home, condominium/apartment, office, retail, etc.), and/or according to a predetermined schedule. Since the test would involve a substantial heating and/or cooling of the enclosure, the test is preferably carried out when the enclosure is unoccupied.

Figure 10:
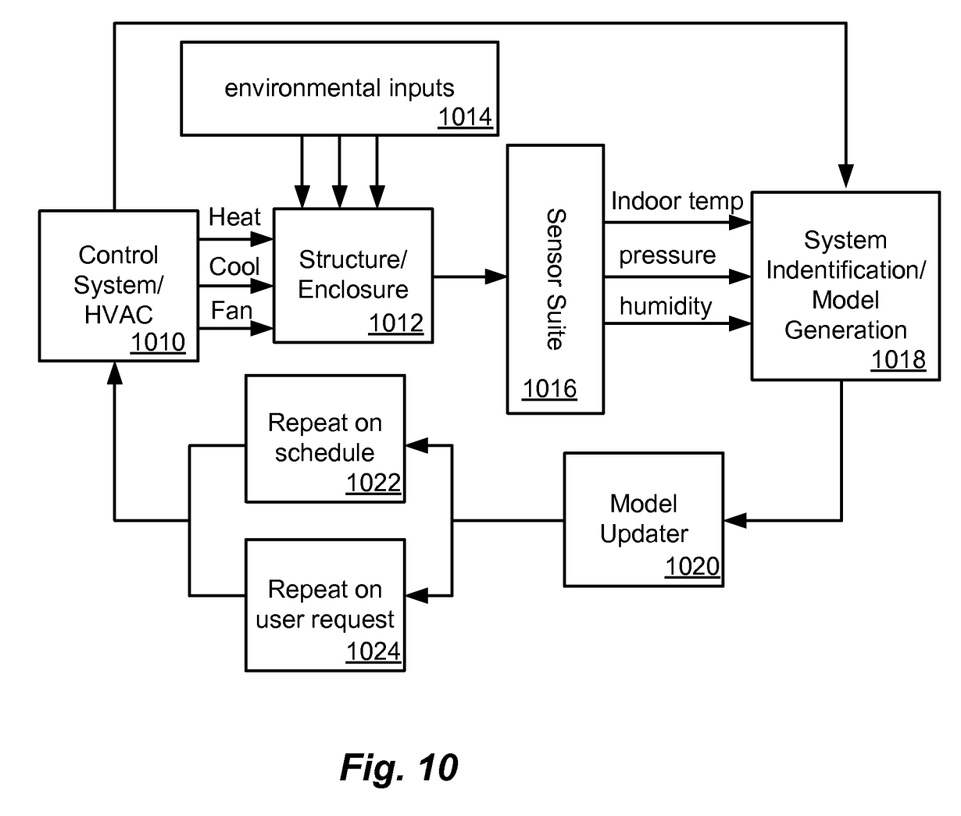
FIG. 10 is a schematic diagram illustrating further detail for thermodynamic modeling of an enclosure, according to some embodiments.

FIG. 10 is a schematic diagram illustrating further detail for thermodynamic modeling of an enclosure, according to some embodiments. A control system and HVAC system 1010 is used to condition an enclosure 1012, for example by heating, cooling and/or ventilation. Environmental inputs 1014 such as outdoor ambient temperature, sunshine, cloud cover, wind, etc. which also influences the enclosure 1012. A sensor suite 1016 is used to measure one or more thermodynamic parameters of the enclosure 1012 such as indoor temperature, pressure, humidity, outdoor temperature, irradiance, wind and/or particulate matter. A system identification module 1018 is used to generate a thermodynamic model for the enclosure. Note that the system identification module 1018 also receives input from the HVAC control system 1010. The model updater 1020 is used to decide whether a new model generated by system identification module 1018 should replace the existing module. The process of model generation can be repeated according to a schedule 1022 or on a user request 1024. The repeating can be, for example by issuing a command to the control system 1010 to actively induce heating and/or cooling in order to further refine the thermodynamic model. According to some embodiments, other factors are used in determining when to induce the change such as described in FIG. 9.

Figure 11:
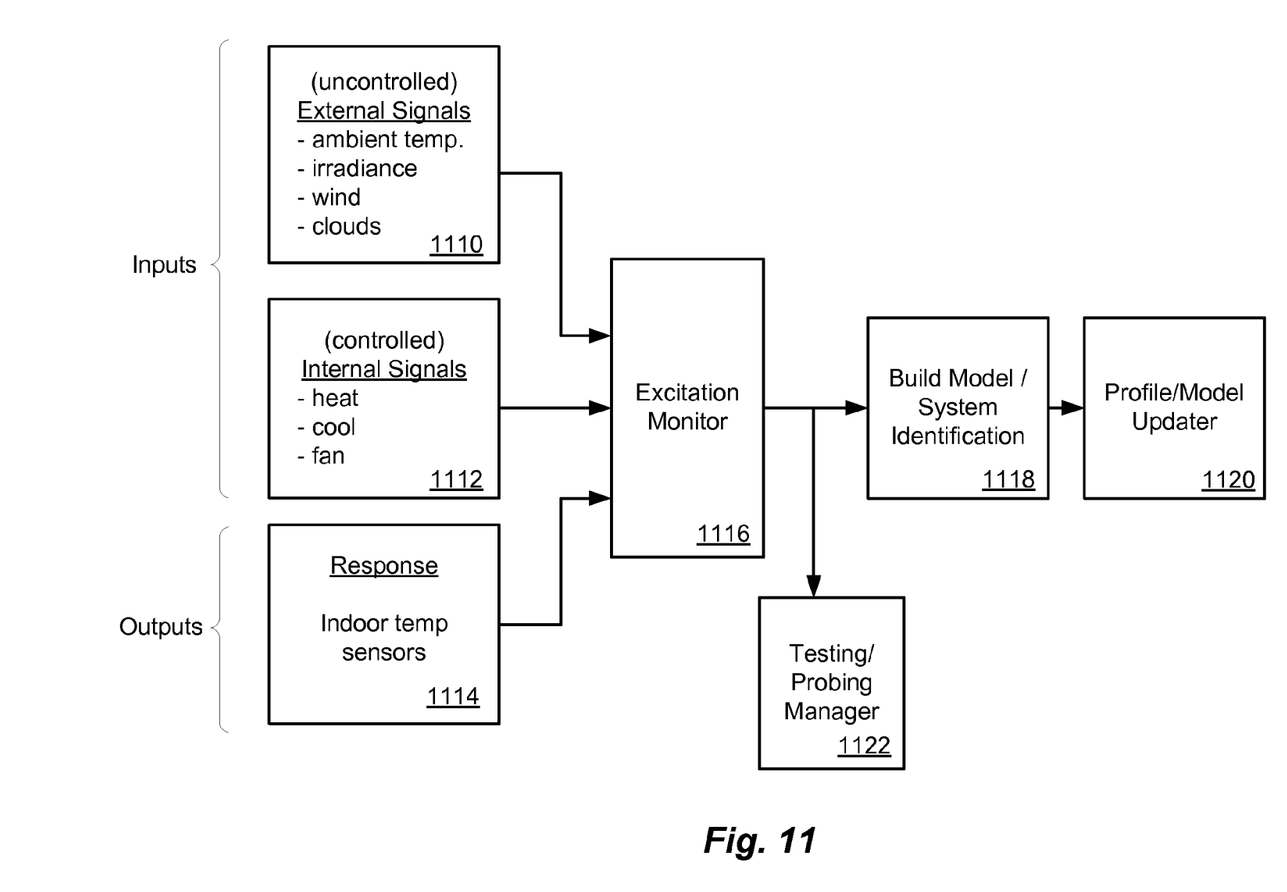
FIG. 11 is a block diagram illustrating an excitation monitor using in thermodynamic modeling of an enclosure, according to some embodiments.

FIG. 11 is a block diagram illustrating an excitation monitor used in thermodynamic modeling of an enclosure, according to some embodiments. External signals 1110 represent uncontrolled inputs such as ambient temperature, irradiance, wind and cloud cover. Internal signals 1112 represent controlled inputs such as heating, cooling and ventilation. Response signals 1114 include outputs such as indoor temperature and indoor humidity. Excitation monitor 1116 monitors the level of persistence of excitation of the uncontrolled inputs 1110 and controlled inputs 1112, as well as the outputs 1114. If sufficient excitation exists over a time interval, as measured by a persistency of excitation metric, then the system identification 1118 is performed on that data set. According to some embodiments the excitation monitor 1116 uses an algorithm based on a threshold of the power content of the monitored signals. According to some embodiments, the excitation monitor 1116 uses an algorithm based on both the power content of the monitored signals and one or more parameters used in the system identification modeling process. Profile/model updater 1120 decides whether to update or replace the existing thermodynamic model for the enclosure with the newly generated one. According to some embodiments, a response error metric is used to determine if the existing models and/or parameters should be updated. As will be explained in further detail with respect to FIG. 12, according to some embodiments a testing/probing manager 1122 also receives input from the excitation manager 1116.

Figure 12:
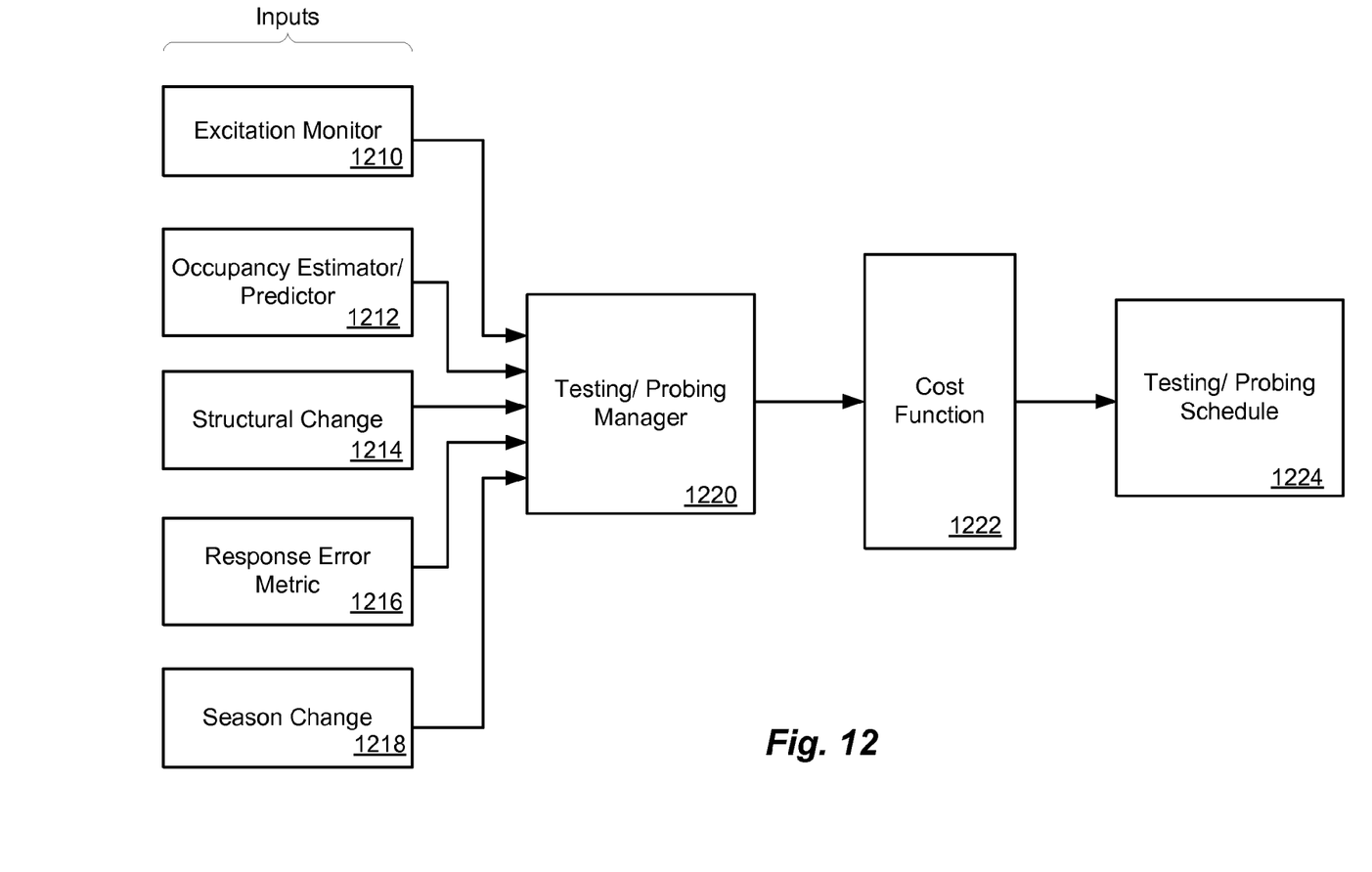
FIG. 12 is a block diagram illustrating the operation of a testing manager and determining when to perform active testing, according to some embodiments.

FIG. 12 is a block diagram illustrating the operation of a testing manager and determining when to perform active testing, according to some embodiments. Inputs to the testing manager 1220 include an excitation monitor 1210, such as described with respect to FIG. 11. Excitation monitor 1210 will indicate whether the current excitation of the input and output signals, as described with respect to FIG. 11, warrants an additional testing sequence. Another input to the testing manager 1220 is an occupancy estimator/predictor 1212. As mentioned with respect to FIG. 9, it is desirable to conduct test or probe when the enclosure is unoccupied. The occupancy estimator/predictor 1212 will indicated whether people are present in the enclosure, or will be in the enclosure when the test is scheduled. According to some embodiments, if people are present, then a comfort metric can predict the level of discomfort induced by the testing sequence. Another input to the testing manager 1220 is if there is a structural change 1214. If there is a structural change, it is likely that the model will need to be updated via testing. Examples of structural changes include adding or removing walls, doors, replacing windows, adding awnings and significant changes in insulation. A major structural change can be, for example, conveyed by a user. Another input to the testing manager 1220 is the response error metric 1216. The response error metric 1216 measures how "good" a given model is performing. If the metric falls below a threshold (for example, due to a structural change, or other un-modeled dynamics) a testing sequence should be initiated. According to some embodiments, the current thermodynamic model predicts one or more parameters such as indoor temperature. Sensors in the enclosure measure the same or corresponding parameters. The outputs are compared to generate the response error metric. Another example of an input to the testing manager 1220 is a change in seasons, 1218.

Based on the inputs, the testing manger 1220 determines whether or not to initiate a testing/probing sequence. The test, for example, could be actively inducing heating and/or cooling of the structure as is described in FIG. 9. According to some embodiments, a cost function 1222 depends on the inputs 1210, 1212, 1214, 1216 and 1218, and the testing sequence from manager 1220. A testing sequence that minimizes the cost function is selected and results in the testing/probing schedule 1224.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the inventive body of work is not to be limited to the details given herein, which may be modified within the scope and equivalents of the appended claims.

What is claimed is:

1. A method for modeling internal environmental behavior of an enclosure for use by a control system of an HVAC system installed in the enclosure comprising:
creating, over time, an occupancy model of the enclosure capable of predicting when there will be no occupants in the enclosure;
determining an error in a current environmental model for the enclosure, wherein the current environmental model describes behavior of the enclosure for use by the control system, by comparing (i) predicted HVAC system performance according the current environmental model, with (ii) actual HVAC system performance; and
updating the current environmental model, if the error exceeds a particular threshold, by:
predicting, from the occupancy model, a period of time when there will be no occupants in the enclosure;
accessing a weather forecast corresponding to the period of time; and
determining if an exterior temperature according to the accessed weather forecast is within a particular range, and if so:
actively inducing, during the period of time, a change in an internal environment of the enclosure;
measuring a response of the internal environment of the enclosure at least in part due to the induced change; and
updating with a processing system the current environmental model, the updating being based at least in part on the measurement of the response from the induced change.

2. A method according to claim 1 wherein the change is actively induced for purposes of updating the current environmental model for the enclosure.

3. A method according to claim 1 where the measured response of the internal environment of the enclosure is further based in part on exterior environmental conditions.

4. A method according to claim 1 wherein the induced change and the response are monitored by an excitation monitor that determines if the change and/or response is adequate to generate an updated environmental model for the enclosure.

5. A method according to claim 1 wherein the change is actively induced in response to input by a user.

6. A method according to claim 1 wherein the change is actively induced automatically by the processing system.

7. A method according to claim 6 wherein the change is actively induced due in part to a change of season.

8. A method according to claim 6 wherein the change is actively induced based at least in part on the type of enclosure.

9. A method according to claim 6 wherein the change is actively induced based at least in part on a difference between measurements made within the enclosure and values predicted by the current environmental model.

10. A method according to claim 6 wherein the processing system determines if the change will be actively induced based at least in part on a cost function.

11. A method according to claim 1 wherein the induced change is heating within at least a portion of the enclosure using the HVAC system.

12. A method according to claim 1 wherein the induced change is cooling within at least a portion of the enclosure using the HVAC system.

13. A method according to claim 1 wherein the induced change is changing the humidity within at least a portion of the enclosure.

14. A method according to claim 1 wherein the enclosure is a dwelling.

15. A system for modeling internal environmental behavior of an enclosure for use by a control system of an HVAC system installed in the enclosure comprising:
a processor; and
a non-transitory storage medium having instructions stored thereon, the instructions executable by the processor to:
create, over time, an occupancy model of the enclosure capable of predicting when there will be no occupants in the enclosure;
determine an error in a current environmental model for the enclosure, wherein the current environmental model describes behavior of the enclosure for use by the control system, by comparing (i) predicted HVAC system performance according the current environmental model, with (ii) actual HVAC system performance; and
update the current environmental model, if the error exceeds a particular threshold, by:
predicting, from the occupancy model, a period of time when there will be no occupants in the enclosure;
accessing a weather forecast corresponding to the period of time; and determining if an exterior temperature according to the accessed weather forecast is within a particular range, and if so:
    actively inducing, during the period of time, a change in the internal environment;
    measuring a response of the internal environment of the enclosure at least in part due to the induced change; and
    updating the current environmental model for the enclosure based at least in part on the measurement of the response from the induced change.

16. A system according to claim 15 where the measured response of the internal environment of the enclosure is further based in part on exterior environmental conditions.

17. A system according to claim 15 wherein the instructions are further executable by the processor to monitor the induced change and the response and determine if the change and/or response is adequate to generate an updated environmental model for the enclosure.

18. A system according to claim 15 wherein the change is actively induced in response to input by a user.

19. A system according to claim 15 wherein the change is actively induced automatically by the processor.

20. A system according to claim 19 wherein the change is actively induced due in part to a change of season.

21. A system according to claim 19 wherein the change is actively induced based at least in part on the type of enclosure.

22. A system according to claim 19 wherein the change is actively induced based at least in part on a difference between measurements made within the enclosure and values predicted by the current environmental model.

23. A system according to claim 19 wherein the processing system determines if the change will be actively induced based at least in part on a cost function.

24. A system according to claim 15 wherein the induced change is heating within at least a portion of the enclosure.

25. A system according to claim 15 wherein the induced change is cooling within at least a portion of the enclosure.

26. A system according to claim 15 wherein the enclosure is a dwelling.

27. A system according to claim 15 wherein the processing system forms part of the control system of the HVAC system.

* * * * *

UNITED STATES PATENT AND TRADEMARK OFFICE
CERTIFICATE OF CORRECTION

| | | |
|---|---|---|
| PATENT NO. | : 8,606,374 B2 | Page 1 of 1 |
| APPLICATION NO. | : 12/881463 | |
| DATED | : December 10, 2013 | |
| INVENTOR(S) | : Anthony Michael Fadell et al. | |

It is certified that error appears in the above-identified patent and that said Letters Patent is hereby corrected as shown below:

In the Claims

Column 12, Line 48 - Please omit "haying" and replace with -- having --.

Signed and Sealed this
Eighth Day of April, 2014

Michelle K. Lee
*Deputy Director of the United States Patent and Trademark Office*